(12) United States Patent
Bayrle et al.

(10) Patent No.: US 7,595,851 B2
(45) Date of Patent: Sep. 29, 2009

(54) COLOR LIQUID CRYSTAL DISPLAY DEVICE

(75) Inventors: Reiner Bayrle, Langenau (DE); Thomas Bitter, Bad Ditzenbach (DE); Otto Bader, Warthausen (DE)

(73) Assignee: Aeg Gesellschaft für Moderne Informationssysteme mbH, Ulm (DE)

( * ) Notice: Subject to any disclaimer, the term of this patent is extended or adjusted under 35 U.S.C. 154(b) by 350 days.

(21) Appl. No.: 11/786,959

(22) Filed: Apr. 13, 2007

(65) Prior Publication Data
US 2007/0252933 A1    Nov. 1, 2007

(30) Foreign Application Priority Data
Apr. 13, 2006    (DE)    .................. 10 2006 017 564

(51) Int. Cl.
*G02F 1/1335*    (2006.01)
(52) U.S. Cl. .................. 349/106; 349/109; 349/115
(58) Field of Classification Search .................. None
See application file for complete search history.

(56) References Cited

U.S. PATENT DOCUMENTS

| | | | |
|---|---|---|---|
| 5,493,430 A | 2/1996 | Lu et al. | |
| 6,377,321 B1 | 4/2002 | Khan et al. | |
| 6,654,080 B1 | 11/2003 | Khan et al. | |
| 6,791,512 B1 | 9/2004 | Shimada | |
| 6,795,148 B2* | 9/2004 | Ozawa et al. | 349/115 |
| 7,057,698 B2* | 6/2006 | Chung et al. | 349/141 |
| 2001/0030720 A1* | 10/2001 | Ichihashi | 349/106 |
| 2004/0041163 A1 | 3/2004 | Iljima | |
| 2004/0239830 A1 | 12/2004 | Nakayoshi et al. | |
| 2005/0036077 A1 | 2/2005 | Khan et al. | |
| 2005/0094069 A1* | 5/2005 | Moon et al. | 349/115 |

FOREIGN PATENT DOCUMENTS

JP    10-054996    2/1998

* cited by examiner

*Primary Examiner*—Tina M Wong
(74) *Attorney, Agent, or Firm*—Morrison & Foerster LLP (57) ABSTRACT

A liquid crystal display (LCD) is disclosed including a first cholesteric liquid crystal (LC) layer between a first and second substrate containing a plurality of adjacent alternately arranged pixels of a first and second primary color. A second cholesteric LC layer between the second substrate and a third substrate contains a plurality of adjacent alternately arranged pixels of the first and a third primary color. The first primary color pixels in the first and second LC layer, and the second primary color pixels in the first LC layer and the primary color pixels of the third primary color in the second LC layer, are arranged behind one another. Two first primary color pixels in the first and second LC layer interact with an adjacent second primary color pixel in the first LC layer and an adjacent third primary color pixel in the second LC layer for representing a display pixel.

16 Claims, 6 Drawing Sheets

COLOR LIQUID CRYSTAL DISPLAY DEVICE

FIELD OF THE INVENTION

The invention relates to a color liquid crystal display device wiht improved resolution.

BACKGROUND OF THE INVENTION

Color liquid crystal display devices with cholesteric liquid crystals are particularly well suited for reflective color LCD display devices. Such color liquid crystal display devices are known in a multiplicity of embodiments. Relevant reference is made, for example, to printed documents U.S. Pat. No. 5,493,430 B, US 2004/0239830 A1 and US 2004/0041163 A1. In these known color liquid crystal display devices, the various colors are represented by mixing the three primary colors red, green and blue. In consequence, three separate pixels in the above three primary colors, which are arranged in one plane, are needed for representing a single color pixel. This limits the resolution of the color liquid crystal display device.

From U.S. Pat. No. 6,791,512 B1, a color LCD display with two liquid crystal layers arranged behind one another is known. In this arrangement, the individual primary color pixels are arranged next to one another in one liquid crystal layer. The second liquid crystal layer is only used for representing primary color pixels from the first liquid crystal layer either offset or not offset. This results in a sharper display.

From printed documents U.S. Pat. Nos. 6,377,321 B1, 6,654,080 B1 and US 2005/0036077 A1, a color liquid crystal display device is in each case known which have two liquid crystal layers arranged behind one another. One liquid crystal layer in this arrangement is used for reflecting visible light and the other liquid crystal layer is used for reflecting IR light. This does not result in an improvement in the resolution.

From JP 10-054996 A, a color liquid crystal display device is known which has a first and a second cholesteric liquid crystal layer which are arranged behind one another in the direction of viewing. The first cholesteric liquid crystal layer is arranged between a first and a second substrate and the second cholesteric liquid crystal layer is arranged between the second and a third substrate. In the first liquid crystal layer, green and red primary color pixels are arranged alternately and in the second liquid crystal layer blue and green primary color pixels are arranged alternately.

A further disadvantage of known color LCD displays consists in that their legibility is unsatisfactory in bright sunlight or in any other bright environment.

SUMMARY OF THE INVENTION

It is the object of the present invention, therefore, to provide a color liquid crystal display device which has an improved resolution.

This object is achieved by the features of Claim 1.

Due to the fact that primary color pixels located both next to one another and behind one another are used for representing one display pixel, only the areas for two instead of the usual three primary color pixels are needed for each display pixel in one plane or, respectively, in one liquid crystal layer. This results in the improved resolution. In addition, the legibility of the display in bright sunlight or in any other bright environment is also improved.

The advantageous embodiment according to Claim 3 simplifies the drive or control since the two primary color pixels of the first primary color are driven by means of a common control line.

The advantageous embodiment according to Claim 4 provides a color liquid crystal display which is suitable both for daytime and for night time operation. In daytime operation, light incident from the direction of viewing, e.g. sunlight, is reflected by the primary color pixels arranged in two liquid crystal layers, in such a manner that an overall pixel in a particular color is obtained. In night time operation, the illumination is produced by a backlighting device which emits light by means of spacing webs between the individual primary color pixels to reflectors on the front of the color LCD display device. The reflectors then reflect the light onto the individual primary color pixels so that a similar appearance as in daytime operation is obtained. The primary color pixels driven for displaying a display pixel with a particular color then reflect colored light in the required composition in the direction of the observer. The absorber layer provides for a defined dark state of the display device.

The absorber layer or absorber elements, respectively, arranged in the area of the primary color pixels can protrude slightly into the spacing webs or correspond exactly to the lateral extent of the primary color pixels or can also be slightly smaller. The reflector elements provided in the area of the spacing webs on the front can be smaller, equal to or greater than the respective spacing webs in the lateral direction. The absorber elements and the reflector elements are dimensioned in such a manner that an optically correct impression of the display device is obtained.

The advantageous embodiment according to Claim 5 increases the luminance of the light reflected by the primary color pixels of the first primary color so that the area of the primary color pixels with the first primary color can be reduced in comparison with the primary color pixels with the second and third primary color. This results in a further improvement in the lateral resolution.

Distributing the primary colors blue, green and red according to Claim 6 and 7 results in better white balance and dark state of the display.

The advantageous embodiment according to Claims 8 to 10 increases the color space in the red domain, i.e. colors can be represented with higher color saturation.

The advantageous embodiment according to Claim 11 prevents light dispersed on the display from passing forward to the observer and thus impairing the quality of the display. In particular, this macroscopically improves the dark state in bright incident light.

The advantageous embodiment according to Claim 12 results in improved efficiency of the backlighting. For example, only every second spacing web can be used for the backlighting whilst the narrower spacing webs are only used for separating the individual primary color pixels.

The advantageous embodiment o according to Claim 13 to 16 takes into account that the primary color pixels of the first primary color are present twice per display pixel as a result of which the area of the two primary color pixels of the first primary color can be reduced compared with the area of the primary color pixels of the other two primary colors. This also reduces the area needed for a display pixel which leads to improved resolution. In addition, this provides for very accurate white balance of the color LCD display.

BRIEF DESCRIPTION OF THE DRAWINGS

Further details, features and advantages are obtained from the description of an illustrative embodiment of the invention which follows.

DETAILED DESCRIPTION OF THE PREFERRED EMBODIMENT

Figure 1:
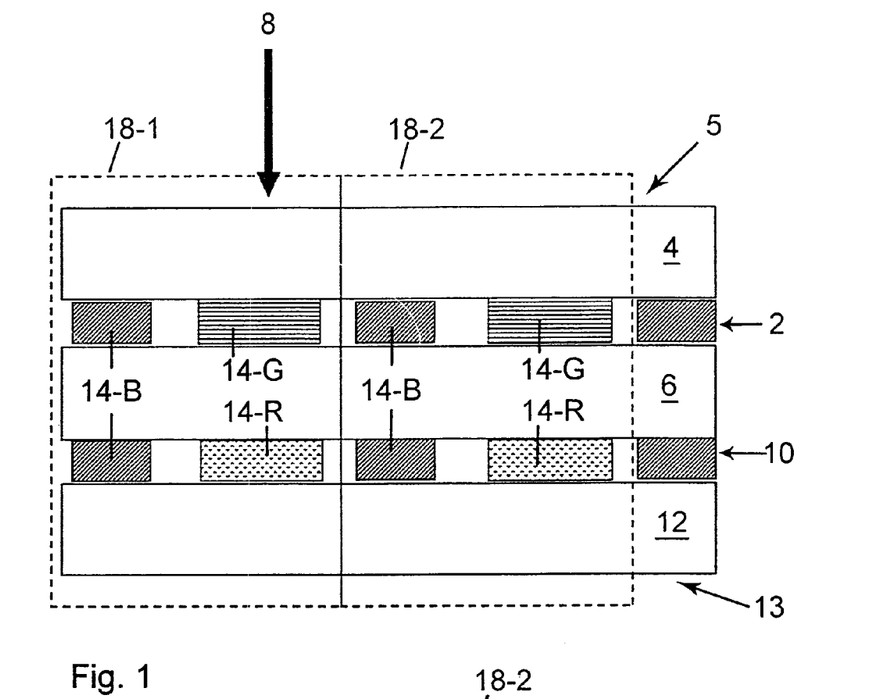
FIG. 1 shows a diagrammatic sectional view of a first embodiment of the invention.

FIG. 1 shows a diagrammatic sectional view of a first illustrative embodiment of the invention. The color LCD display shown comprises a first liquid crystal layer 2 which is enclosed between a first substrate 4 and a second substrate 5. In the direction of viewing 8 behind the first liquid crystal layer 2, a second liquid crystal layer 10 is arranged which is enclosed between the second substrate and a third substrate 12. The first, second and third substrate 4, 6 and 12 consist preferably of glass. In the first and second liquid crystal layer 2 and 10, a plurality of primary color pixels 14 in the three primary colors blue, green and red are in each case arranged at a distance from one another. The first primary color B is blue, the second primary color G is green and the third primary color R is red.

Figure 2:
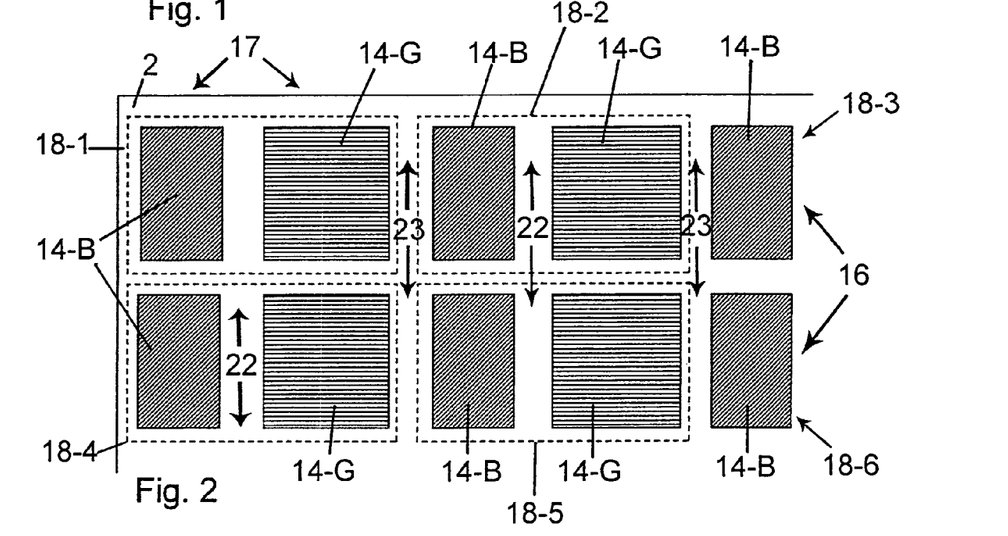
FIG. 2 shows a top view of the primary color pixels of the first liquid crystal layer of the embodiment according to FIG. 1.
Figure 3:
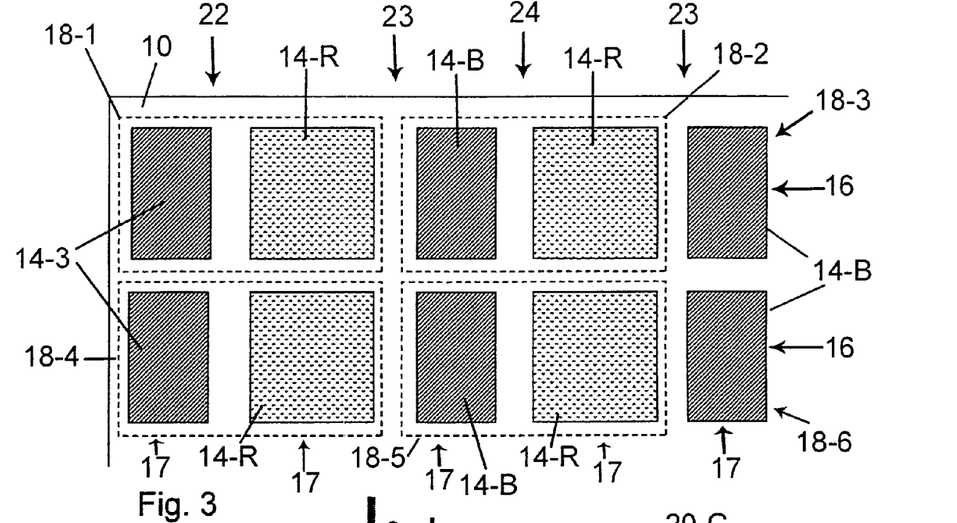
FIG. 3 shows a top view of the primary color pixels of the second liquid crystal layer of the embodiment according to FIG. 1.

FIG. 2 diagrammatically shows that blue and green primary color pixels 14-B and 14-G are arranged alternately in a row 16 in the first liquid crystal layer 2. In the individual primary color pixel columns 17, primary color pixels 14 of the same color are thus in each case arranged. FIG. 3 shows a top view of the matrix arrangement of the primary color pixels 14 in the second liquid crystal layer 10 with a plurality of blue primary color pixels 14-B and red primary color pixels 14-R, wherein blue and red primary color pixels 14-B and 14-R are arranged alternately. In the individual primary color pixel columns 17, primary color pixels 14 of the same color are thus arranged in each case. The blue primary color pixels 14-B in the first liquid crystal layer 2 have a helicity which is opposite to the helicity of the blue primary color pixels 14-2 in the second liquid crystal layer 10. For example, the blue primary color pixels 14-E in the first liquid crystal layer 2 are dextrorotatory whilst the blue primary color pixels 14-B in the second liquid crystal layer 10 are laevorotatory. The helicity of the green and red primary color pixels 14-G and 14-R is not decisive and can thus be selected arbitrarily. As shown in FIG. 2 and 3, the red and green primary color pixels 14-R and 14-G are of equal size with regard to their surface extent and the blue primary color pixels 14-B are approximately half as large.

The individual primary color pixels 14 are driven in a familiar manner via transparent electrodes which are not shown in the drawing for reasons of clarity. Four immediately adjacent primary color pixels 14 interact in each case for displaying a single display pixel 18-*i*. These are in each case two immediately adjacent primary color pixels 14 in the first liquid crystal layer 2 and in each case two primary color pixels 14 arranged immediately underneath these in the second liquid crystal layer 10. In each display pixel 18-*i*, a blue primary color pixel 14-B and a green primary color pixel 14-G in the first liquid crystal layer 2 and a blue primary color pixel 14-B and a red primary color pixel 14-R in the second liquid crystal layer 10 thus interact. In FIGS. 2 and 3, four display pixels 18-1, 18-2, 18-4 and 18-5 are in each case shown completely and two display pixels 18-3 and 18-6 are shown only partially. In the remaining FIGS. 1 and 4 to 9, two display pixels 18-1 and 18-2 are in each case shown completely and one display pixel 18-3 is in each case shown partially.

Figure 4:
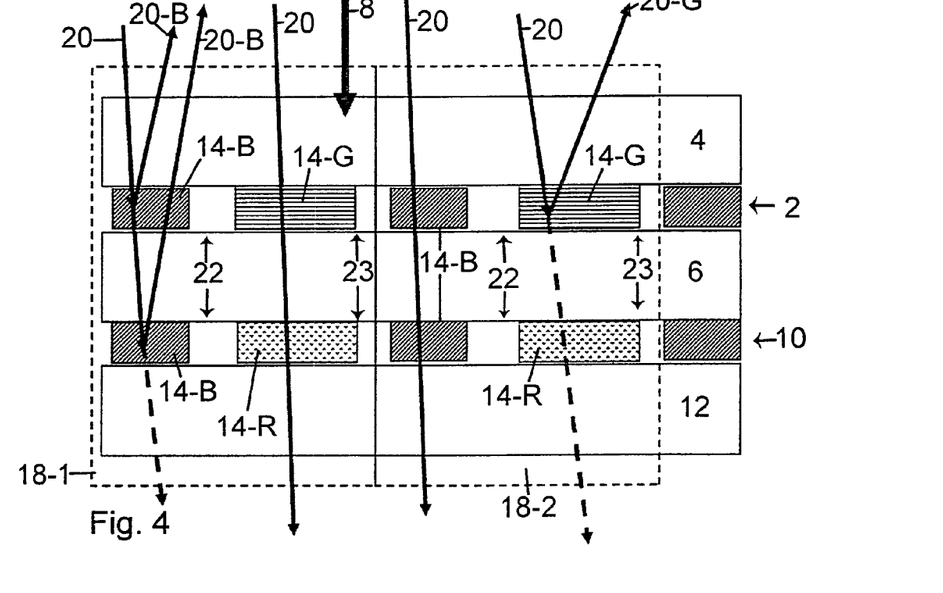
FIG. 4 shows the embodiment according to FIG. 1 wherein the primary color pixels are connected in such a manner that blue and green light is reflected towards the observer.
Figure 5:
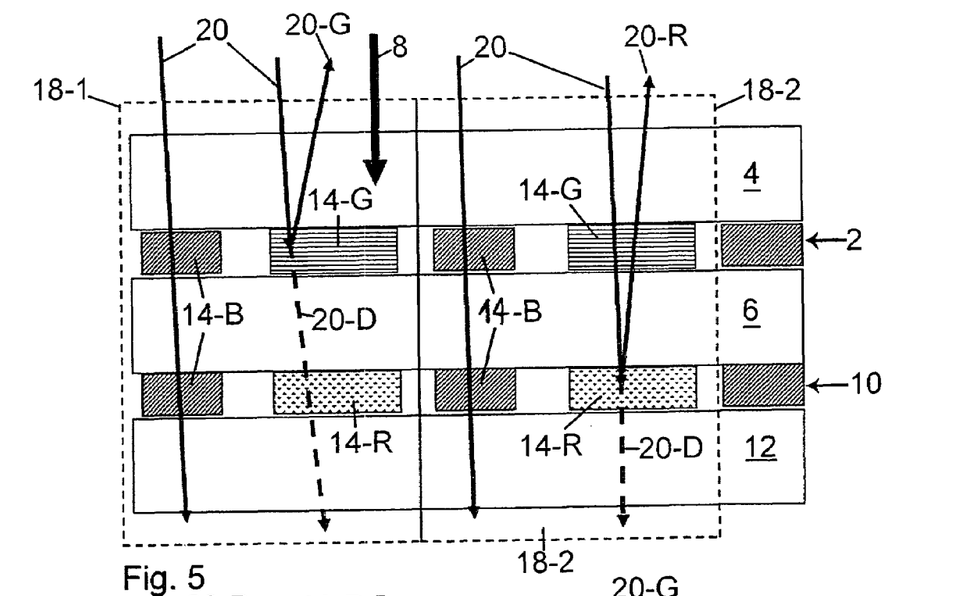
FIG. 5 shows the embodiment according to FIG. 1 wherein the primary color pixels are connected in such a manner that green and red light is reflected towards the observer.
Figure 6:
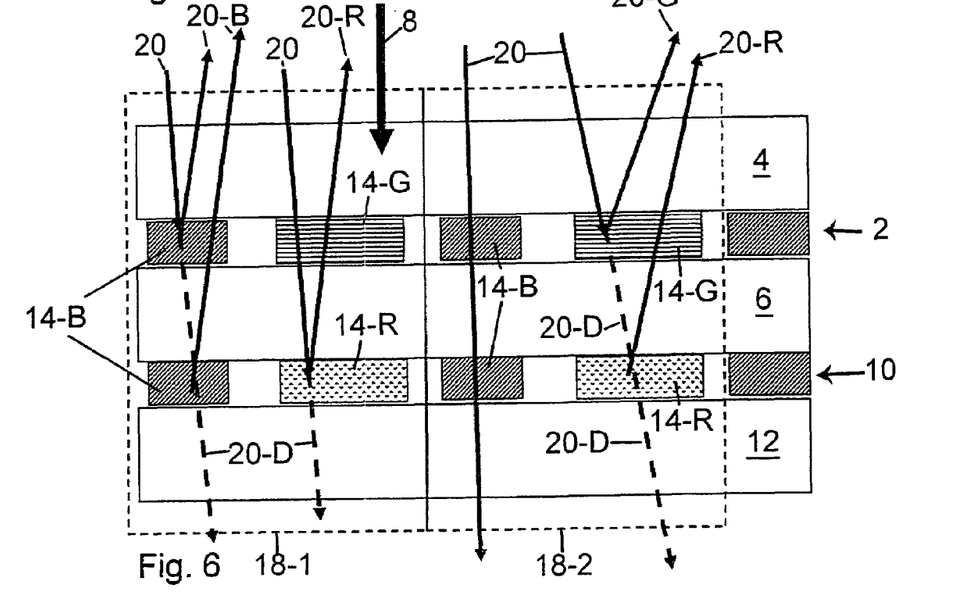
FIG. 6 shows the embodiment according to FIG. 1 wherein the primary color pixels are connected in such a manner that purple and yellow light is reflected towards the observer.

FIGS. 4 to 6 then diagrammatically show the illumination of the color liquid crystal display according to the first embodiment with light, e.g. with sunlight which is incident on the color LCD display from the direction of viewing 8. In this first embodiment, the blue primary color pixel 14-B in the first liquid crystal layer 2 has a dextrorotatory helicity and the blue primary color pixel 14-B in the second liquid crystal layer 10 has a laevorotatory helicity. The individual primary color pixels 14 are switched by means of the drive electrodes, not shown, in such a manner that the color display pixel 18-1 glows blue and the color display pixel 18-2 glows green in FIG. 4. In FIG. 5, the color display pixel 18-1 glows green and the color display pixel 18-2 glows red. In FIG. 6, the color display pixel 18-1 glows purple and the color display pixel 18-2 glows yellow.

As can be seen from FIG. 4, the laevorotatory component from the white light 20 incident on the dextrorotatory, blue-reflecting primary color pixels 14-B in the first liquid crystal layer 2 is reflected as blue light 20-B to the observer. The remaining part of the white light 20 penetrates through the dextrorotatory blue primary color pixels 14-B and is incident on the laevorotatory blue primary color pixels 14-B in the second liquid crystal layer 10. The laevorotatory blue primary color pixel 14-B in the second liquid crystal layer 10 reflects the dextrorotatory blue component as blue light 20-B towards the observer. The remaining light 20-D penetrates through the laevorotatory blue primary color pixel 14-B and is absorbed, for example, in an absorber, not shown. Due to the different helicity of the blue primary color pixels 14-B in the first and second liquid crystal layer 2 and 10, both blue primary color pixels 14-B arranged underneath and behind one another, respectively, contribute to the color reflection so that the size of the blue primary color pixels 14-B can be reduced in comparison with the size of the green and red primary color pixels. The green and red primary color pixel 14-G and 14-R in the first and second liquid crystal layer 2 and 10, respectively, are switched to transmittance so that the white light 20 which is incident on the green and red primary color pixels 14-G and 14-R is transmitted without reflection and thus does not contribute to the display. The first display pixel 18-1 therefore glows blue.

White light 20 incident on the second display pixel 18-2 is transmitted, or not reflected, respectively, by the blue primary color pixels 14-B both in the first liquid crystal layer 2 and in the second liquid crystal layer 10. Thus, no blue light is reflected towards the observer. Of the white light 20 incident on the green primary color pixel 14-G, the green component 20-G is reflected towards the observer. Light components 20-D which are incident on the red primary color pixel 14-R in the second liquid crystal layer 10 are transmitted without reflection. The second display pixel 18-2 therefore glows green.

In the representation in FIG. 5, the individual primary color pixels 14 are switched in such a manner that the first display pixel 18-1 generates green light whilst the second display pixel 18-2 generates red light.

White light 20 incident on the first display pixel 18-1 is thus transmitted, or not reflected, respectively, by the blue primary color pixels 14-B both in the first liquid crystal layer 2 and in the second liquid crystal layer 10 so that no blue light passes to the observer. Of the white light 20 incident on the green primary color pixel 14-G, the green component 20-G is reflected towards the observer, the remaining light 20-D passes through the green primary color pixel 14-G. These light components 20-B which are incident on the red primary color pixel 14-R in the second liquid crystal layer 10 are transmitted without reflection and absorbed. The first display pixel 18-1 thus glows green.

White light 20 incident in the second display pixel 18-2 is transmitted, or not reflected, respectively, by the blue primary color pixels 14-B both in the first liquid crystal layer 2 and in the second liquid crystal layer 10. Light incident in the area of the green primary color pixel 14-G is transmitted and is incident on the red primary color pixel 14-R arranged behind it in the second liquid crystal layer 10. This red primary color pixel 14-R reflects the red component 20-R towards the observer through the green primary color pixel 14-G switched to transmittance, the remaining light 20-D passes through the red primary color pixel 14-R and is absorbed. The second display pixel 18-2 thus glows red.

In the representation in FIG. 6, the individual primary color pixels 14 are switched in such a manner that the first display pixel 18-1 generates purple light whilst the second display pixel 18-2 generates yellow light.

In consequence, the four primary color pixels 14 in the first display pixel 18-1 are switched in such a manner that of the incident white light 20, the blue component 20-B is reflected towards the observer by the two blue primary color pixels 14-B as in the case of FIG. 3, the remaining light 20-D passes through the two blue primary color pixels 14-B. White light 20 incident in the area of the green primary color pixel 14-G is transmitted and is incident on the red primary color pixel 14-R arranged behind it in the second liquid crystal layer 10. This red primary color pixel 14-R reflects the red component 20-R of the light towards the observer through the green primary color pixel 14-G switched to transmittance, the remaining light 20-D passes through the red primary color pixel 14-R. Mixing the blue and red light results in a purple color impression for the first display pixel 18-1.

White light 20 incident on the second display pixel 18-2 is transmitted, or not reflected, respectively, by the blue primary color pixels 14-B both in the first liquid crystal layer 2 and in the second liquid crystal layer 10 so that no blue light passes to the observer. Of the light incident in the area of the green primary color pixel 14-G, the green component 20-G is reflected towards the observer. Of the light components 20-D incident on the red primary color pixel 14-R arranged behind them in the second liquid crystal layer 10, the red component 20-R is reflected towards the observer through the green primary color pixel 14-G, the remaining light 20-D passes through the red primary color pixel 14-R. Mixing the red and green light components 20-R and 20-G results in yellow light. The second display pixel 18-2 thus glows yellow.

In the text which follows, a second embodiment of the invention is described with reference to FIGS. 7 to 10. The second embodiment corresponds to the first embodiment in its basic structure. Differences consist in that in the second embodiment, the second substrate 6 is split into a first part-substrate 6-1 and a second part-substrate 6-2 and that a color filter 21 for improving the color quality of the red primary color pixels 14-R is provided between the two part-substrates 6-1 and 6-2. Between the individual primary color pixels 14, spacing webs 22 and 23 are provided, narrower spacing webs 22 and wider spacing webs 23 being provided alternately. On the front 5 of the first substrate 4, reflectors 24 are provided in the area of the spacing webs 22 and 23. On the side of the reflectors 24 facing the observer, an absorber layer 26 is applied. On the back 13 of the third substrate 12, a further absorber layer 28 is provided in the areas outside the spacing webs 22 and 23, i.e. behind the primary color pixels 14. In the direction of viewing 8 behind this further absorber layer 28, a backlighting device 30 is arranged, e.g. in the form of LED backlighting or an OLED layer.

In the text which follows, the operation of this second embodiment in daytime operation, i.e. with ambient or sunlight, and in night time operation with backlighting device 30 switched on is described with reference to FIGS. 8 and 9.

Figure 8:
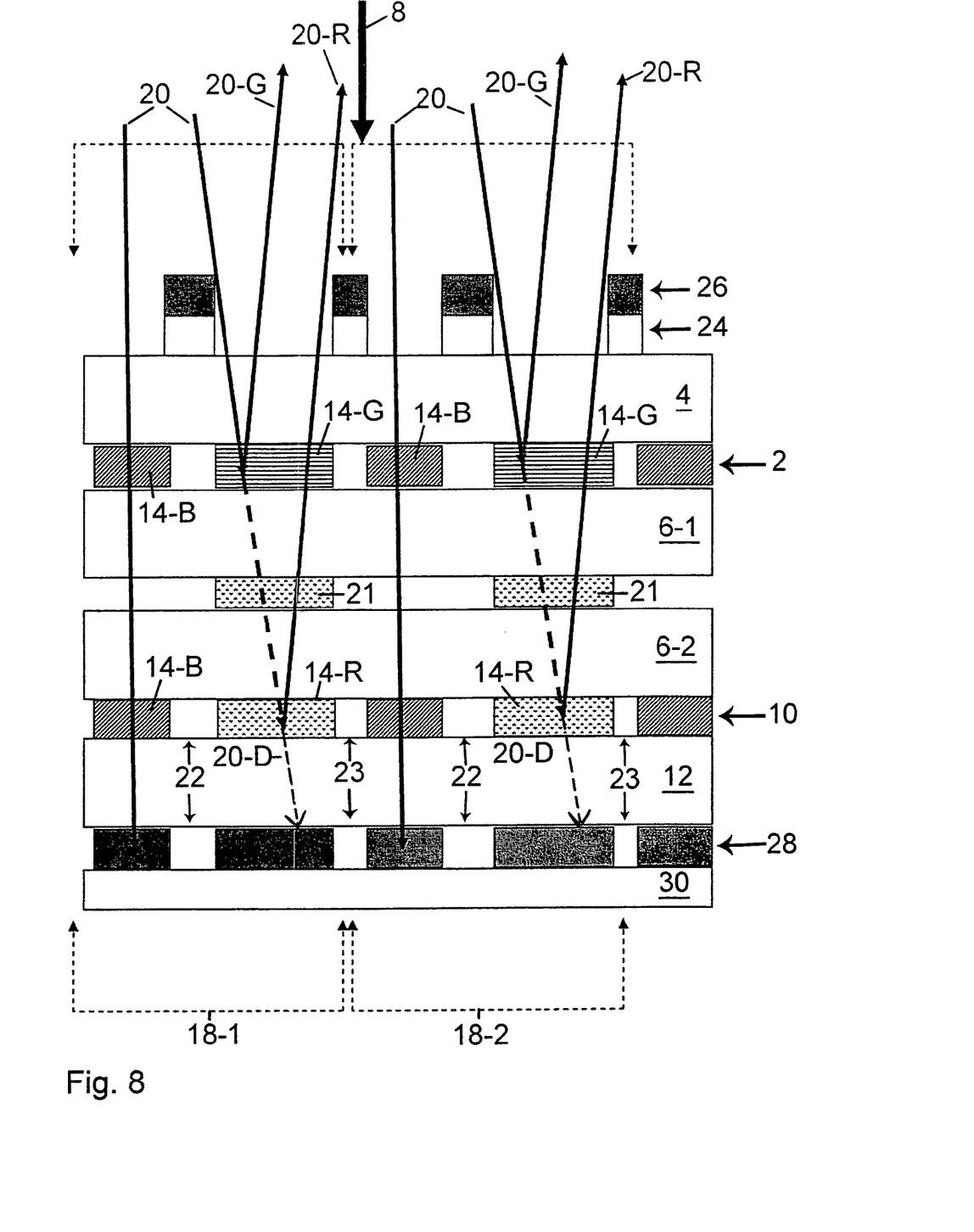
FIG. 8 shows the second embodiment according to FIG. 7 in daytime operation when displaying a yellow display pixel.

The representation in FIG. 8 shows daytime operation, i.e. with backlighting device 30 switched off. The individual primary color pixels 14 are switched in such a manner that both the first display pixel 18-2 and the second display pixel glow yellow. White light 20 incident from the direction of viewing 8 passes through the blue primary color pixels 14-B and is absorbed in the further absorber layer 28. From the white light 20 incident on the green primary color pixels 14-G, the green component 20-G is reflected in the direction of the observer. The transmitted component 20-D of the white light 20 passes through the color filter 21 which essentially only transmits red light, and is incident on the red primary color pixels 14-R where it is reflected almost completely back through the color filter 21 and also through the green primary color pixels 14-G towards the observer. In the aggregate, this results in a yellow display pixel.

Figure 9:
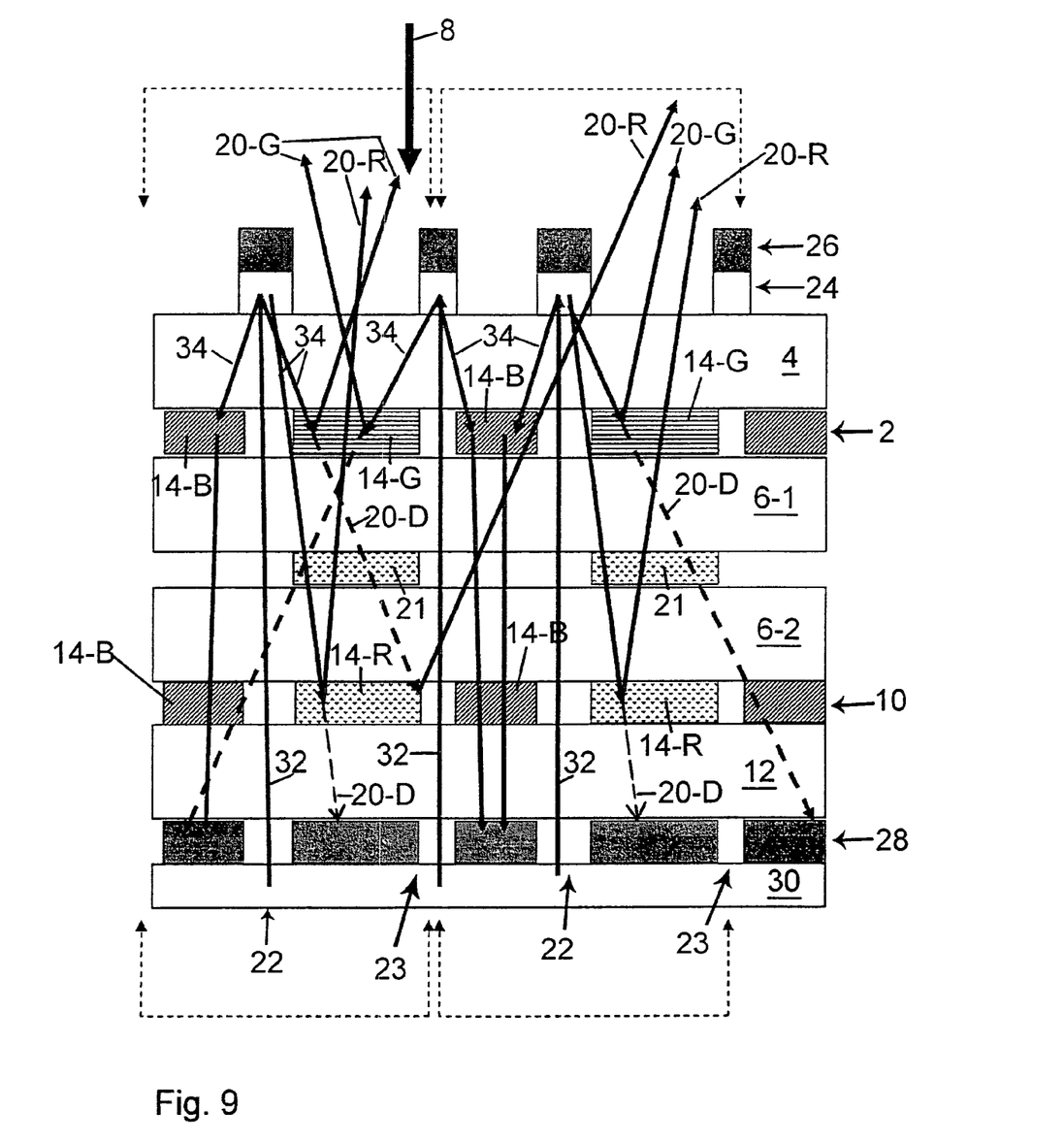
FIG. 9 shows the embodiment according to FIG. 7 in night time operation with activated backlighting for displaying a yellow display pixel.

In FIG. 9, too, both the first and the second display pixel 18-1 and 18-2 glow yellow. However, the color display device is not illuminated with ambient light but by light 32 from the activated backlighting device 30. The white light 32 from the backlighting device 30 is conducted through the spacing webs 22 and 23 to the reflectors 24 and is there reflected onto the individual primary color pixels 14 in the same way as the ambient light in daytime operation so that a yellow display pixel is displayed in the same way as in daytime operation. The reflectors 24 are arranged in such a manner that light incident perpendicularly is reflected back conically. This results in light rays 34 which are incident on a blue primary color pixel 14-B, on the wide spacing web 22 and on the green primary color pixel in each case in the first liquid crystal layer 2. The light 34 incident on the blue primary color pixel 14-B passes through the blue primary color pixel 14-B in the first liquid crystal layer 2 and also the blue primary color pixel 14-B in the second liquid crystal layer 10. The light 34 incident on the wide spacing web 22 is incident on the red color filter 21 and subsequently on the red primary color pixel 14-R and is reflected towards the observer as red light 20-R. From the light 34 incident on the green primary color pixel 14-G, the green component 20-G is reflected towards the observer. The residual transmitted light 20-D is incident on the red color filter 21 and then on the red primary color pixel 14-R. The red primary color pixel 14-R reflects the incident light 20-D almost completely as red light 20-R towards the observer. Residual light 20-D passing through individual primary color pixels 14 is absorbed in the further absorber layer 28 on the back 13 of the third substrate 12.

Figure 7:
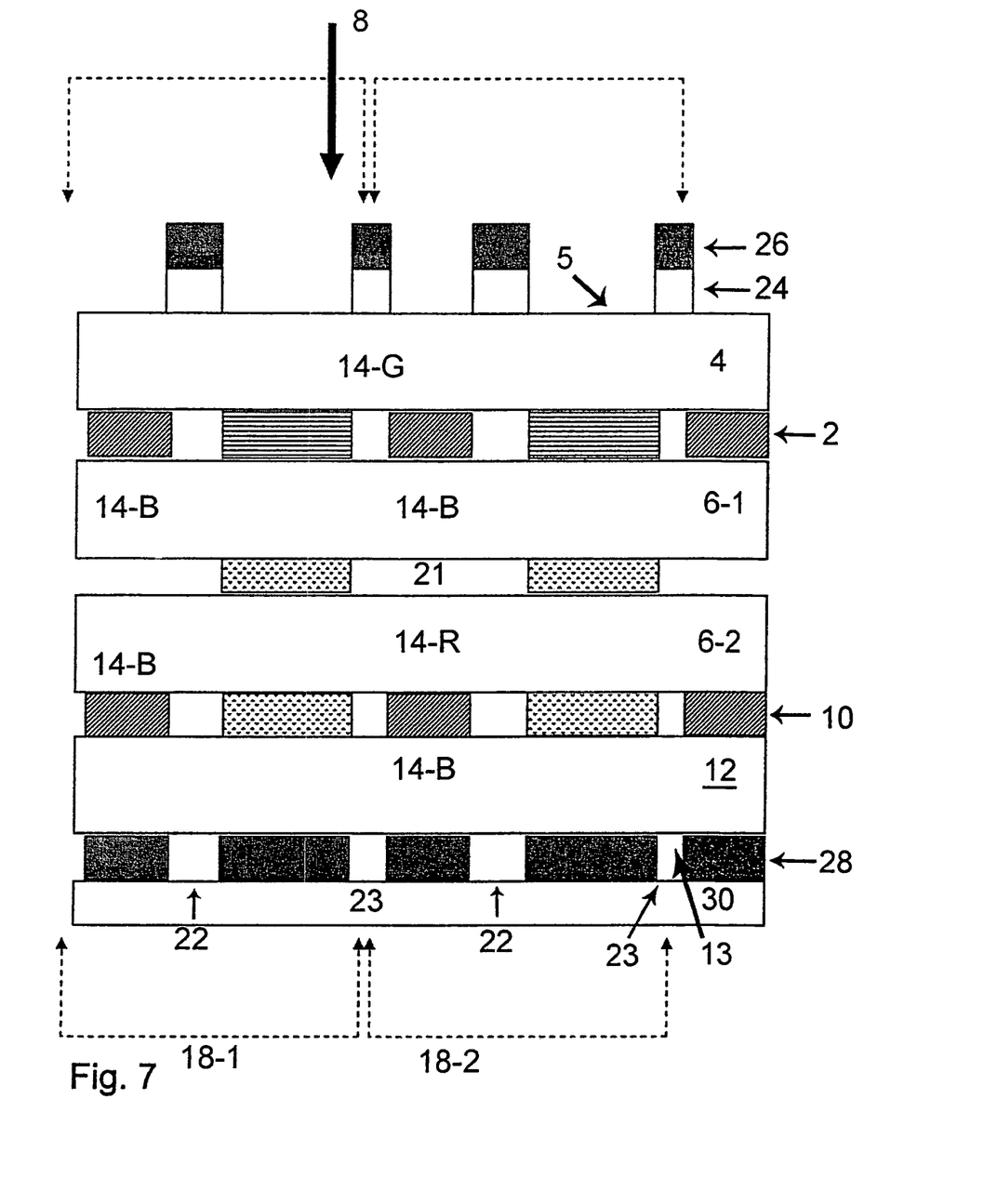
FIG. 7 shows the basic structure of a second embodiment of the invention which can be illuminated both with ambient light and by a backlighting device.

In the second embodiment, the illumination by the backlighting device 30 in night time operation is effected both by the smaller spacing webs 23 and the larger spacing webs 22 and the reflectors 24. The illumination webs 22, 23 consist of transparent material, e.g. of a transparent adhesive in the area of the first and second liquid crystal layer 2, 10 and of transparent potting material, e.g. of silicone, in the area of the red color filter 21 between the first and second part-substrate 6-1, 6-2.

As an alternative, the illumination can be effected essentially only via every second spacing web 22, i.e. the spacing webs 22 are much wider than the spacing webs 23. The spacing webs 23 are then used only for separating adjacent primary color pixels 14 and the display is illuminated by the wide spacing webs 22. To a certain extent, the amount of light available for illuminating the primary color pixels 14 can also be controlled via the width of the spacing web transversely to the direction of viewing 8.

In the liquid crystal layers, spacing elements, so-called spacers, can be arranged as is known, e.g., from EP 2009704.4 A1.

It is pointed out that the representations relating to the two illustrative embodiments are diagrammatic and, in particular, the individual beam paths are not always drawn strictly in accordance with the geometric optics.

What is claimed is:

1. Color liquid crystal display device, comprising
a first cholesteric liquid crystal layer which is arranged between a first and a second substrate which contains a plurality of primary color pixels arranged next to one another, wherein primary color pixels of a first and of a second primary color are alternately arranged next to one another, and
a second cholesteric liquid crystal layer which is arranged behind the first liquid crystal layer between the second substrate and a third substrate in the direction of viewing, which contains a plurality of primary color pixels arranged next to one another, wherein primary color pixels of the first and of a third primary color are alternately arranged next to one another,
wherein the primary color pixels of the first primary color in the first and second liquid crystal layer are arranged behind one another in the direction of viewing,
wherein the primary color pixels of the second primary color in the first liquid crystal layer and the primary color pixels of the third primary color in the second liquid crystal layer are arranged behind one another in the direction of viewing, and
wherein in each case two primary color pixels of the first primary color which are arranged behind one another in the first and second liquid crystal layer interact with the adjacent primary color pixel of the second primary color in the first liquid crystal layer and the adjacent primary color pixel of the third primary color in the second liquid crystal layer for representing a display pixel.

2. Color liquid crystal display device according to claim 1, characterized in that primary color pixels in the first and second liquid crystal layer are driven individually.

3. Color liquid crystal display device according to claim 2, characterized in that primary color pixels of the first primary color in the first and second liquid crystal layer are driven jointly.

4. Color liquid crystal display device according to claim 1, characterized in that spacing webs are provided between the individual primary color pixels arranged next to one another,
in that the spacing webs in the first liquid crystal layer are arranged behind the spacing webs in the second liquid crystal layer in the direction of viewing, and
in that a plurality of reflector elements are provided in the area of the spacing webs in front of the first liquid crystal layer in the direction of viewing,
in that light absorber elements are arranged behind the second liquid crystal layer in the direction of viewing in the area of the primary color pixels, and in that a backlighting device is provided behind the absorber elements in the direction of viewing.

5. Color liquid crystal display device according to claim 1, characterized in that the primary color pixels of the first primary color arranged behind one another in the first and the second liquid crystal layer have an opposite helicity.

6. Color liquid crystal display device according to claim 1, characterized in that the first primary color is blue.

7. Color liquid crystal display device according to claim 6, characterized in that the second primary color is green and the third primary color is red.

8. Color liquid crystal display device according to claim 7, characterized in that a red filter is arranged in front of the primary color pixels of the primary color red in the direction of viewing and/or in that a red dye, particularly a dichroitic dye, is introduced in the liquid crystal of the red primary color pixel.

9. Color liquid crystal display device according to claim 1, characterized in that the second substrate consists of a first and a second part-substrate so that the first liquid crystal layer is enclosed between the first substrate and the first part-substrate and that the second liquid crystal layer is enclosed between the second part-substrate and the third substrate.

10. Color liquid crystal display device according to claim 9, characterized in that the primary color pixel of the primary color red is arranged in the second liquid crystal layer and in that the red filter is arranged between the two part-substrates.

11. Color liquid crystal display device according to one of the preceding claims 4 to 10, characterized in that in the direction of viewing light absorber elements are provided on the reflector elements in front of the reflector elements.

12. Color liquid crystal display device according to one of the preceding claims 4 to 10, characterized in that immediately adjacent spacing webs have a different width.

13. Color liquid crystal display device according to claim 1, characterized in that the surface extent of the primary color pixels of the first primary color is smaller than the surface extent of the primary color pixels of the second and third primary color.

14. Color liquid crystal display device according to claim 13, characterized in that the surface extent of the primary color pixels of the first primary color is between 20% and 70% and preferably between 30% and 60% of the surface extent of the primary color pixels of the second and third primary color.

15. Color liquid crystal display device according to claim 13 or 14, characterized in that the surface extent of the primary color pixels of the second and third primary color is equal.

16. Color liquid crystal display device according to one of the preceding claims 13 to 14, characterized in that the surface extent of the primary color pixels of the first primary color is equally large in the first and second liquid crystal layer.

* * * * *